Patented Nov. 5, 1935

2,019,553

UNITED STATES PATENT OFFICE 2,019,553

PRODUCTION OF ALUMINA

Charles B. Willmore, New Kensington, and Conral C. Callis, Oakmont, Pa., assignors to Aluminum Company of America, Pittsburgh, Pa., a corporation of Pennsylvania No Drawing. Application July 19, 1932, Serial No. 623,394

13 Claims. (Cl. 23—141)

This invention relates to the production of alumina from aluminous substances. It relates especially to the acid extraction of alumina from aluminous substances of varying grade, such as high and low grade bauxites, bauxite tailings, kaolin, clay, and the like, and more specifically to the extraction of alumina from such substances with nitric acid.

It is known that alumina can be extracted from bauxite and other aluminous substances by digestion with solutions of caustic alkali, such as caustic soda. This type of extraction is widely used, as in the well known Bayer process, for example, the digestion being generally carried out at elevated temperatures and pressures. This type of digestion produces quite satisfactory results when high grade, low silica ores are available.

Such processes are not well adapted to the extraction of alumina from ores containing a larger percentage of silica, however, as the silica tends to dissolve during the alkaline pressure digestion and may react to form zeolites and cause contamination of the recovered alumina. Large losses of alumina and caustic are also incurred in alkaline digestions of this type of material. This makes it necessary to carefully select or classify the raw material (e. g. bauxite) employed, and even then the alumina recovered may not be as pure as is desired. In any event, due to the necessity of using high grade raw material the cost of the alumina produced is greater than it would be if low grade ores, such as clays and the tailings discarded in the selection of raw material for the alkaline extraction processes, could be made to yield a satisfactory product.

In order to make possible the utilization of clays, low grade bauxites, and other aluminous ores which are relatively cheap and plentiful, various attempts have been made to device satisfactory acid extraction processes. Various acids have been tried for this purpose and it has been shown that nitric acid has many points of advantage over the other common acids. However, all previous acid extraction processes have had distinct and well recognized disadvantages which have prevented their general adoption. The outstanding disadvantages are that it has been difficult to obtain extraction of a satisfactorily high percentage of alumina, especially at atmospheric or substantially atmospheric pressures, and that iron, which is almost invariably present in the raw material, dissolves to an objectionable extent during the acid extraction and remains as an impurity in the recovered alumina. A further disadvantage is that, because of the corrosive action of the acid liquors, special corrosion-resisting equipment must be used. This adds materially to the cost of extraction, especially in previous processes in which it is necessary to operate at increased pressures to increase the yield of alumina.

An object of the present invention is to provide an improved process of extracting alumina from aluminous substances of varying grade, including bauxites, clays, and other ores of aluminum.

A second object of our invention is to improve the yield of alumina in processes for the acid extraction thereof from aluminous substances, especially when nitric acid is employed in the extraction.

Another object of our invention is to provide an improved acid process of extracting alumina from aluminous substances, in which process the amount of iron simultaneously extracted is materially less than the amount extracted in the operation of previous processes under similar conditions.

Our invention has for further objects such other operative advantages and results as are found to obtain in the process described and claimed herewith.

Our invention contemplates the extraction of alumina from aluminous material with an acid to which is preferably added a substance which has the effect of increasing the percentage of alumina extracted, and of depressing the solution of iron during extraction or precipitating it thereafter. The conditions of temperature and pressure maintained during extraction may be varied over a relatively wide range, as will be apparent from the more detailed description hereinbelow. While certain acid mixtures may be used, we prefer to employ nitric acid, or an acid mixture consisting chiefly of nitric acid, in concentrations and proportions which may also be widely varied.

For increasing the yield of alumina and eliminating iron from the solution we prefer to employ fluorine compounds such as hydrofluoric acid, or alkali or alkaline earth salts thereof, of which sodium fluoride and calcium fluoride are, respectively, preferred examples. The effect of such compounds will be referred to hereinbelow as "activation" and substances having this effect will be referred to as "activators" or "activating agents". Substances other than fluorine compounds which have a similar effect on the acid extraction are included in the term "activating agents".

The amount of fluorine compound or other activating agent employed may be varied considerably according to the conditions maintained and the nature of the raw material treated, but in general only a small amount is required. The action of the activating agent in increasing the yield of alumina and eliminating iron from the solution is not definitely known, but since such a small quantity of the agent is involved it is believed that its action is catalytic or pseudo-catalytic in nature. There is also a possibility that the activator serves as a "carrier" for the alumina.

When the extraction of alumina is completed the digestion liquor containing alumina in solution, usually in the form of normal or basic aluminum nitrate, is separated from the undissolved residue, as by filtration. The liquor may then be neutralized, employed for the extraction of alumina from a further quantity of raw material, or subjected to other treatment. It is then concentrated and cooled and aluminum nitrate crystals are recovered. When the mother liquor thereby produced is basic, which is preferably the case, it may be employed advantageously for the neutralization of acid digestion liquor as described and claimed in the copending application of Ralph B. Derr, Serial No. 623,399 filed July 19, 1932.

The aluminum nitrate crystals are decomposed by heat to yield alumina and nitric acid vapors, which may also contain other oxides of nitrogen. These vapors and the vapors evolved during the concentration of the liquor are recovered as nitric acid, which is employed in the extraction of further quantities of raw material.

In producing alumina from clay, bauxite, or other aluminous material in accordance with our improved process, the raw material may or may not be calcined. The effect of calcination varies, depending on the nature of the material treated, the temperature to which the calcination is carried, the time during which the maximum temperature is maintained, and the nature of the atmosphere (reducing or oxidizing) to which the heated raw material is exposed.

We have found that in the calcination of a typical bauxite having about 28% to 30% loss on ignition, the best results are usually obtained with calcination at temperatures between 500° and 600° C. The calcination should be continued at this temperature for a period sufficient to remove about 60% to 90% of the combined water, or until loss on ignition of the residue is about 5% to 12%, depending on its nature. Calcination at higher temperature or for a longer period to give a loss on ignition below about 3% results in the production of relatively insoluble alumina. The yield of alumina from some types of raw material is not improved appreciably by any calcining treatment so far devised.

The raw or calcined aluminous material, with or without pretreatment to remove excess iron, is then treated with nitric acid, in the preferred instance, to extract alumina therefrom in the form of aluminum nitrate solution which may have additional alumina dissolved therein. In this stage of our process the aluminous material is heated with nitric acid of suitable strength, to which a fluorine compound or other activating agent has been added.

The strength or acidity of the extracting solution may be varied as previously stated, usually within the range from 20% to 50% $HNO_3$, but is preferably equivalent to from 30% to 40% $HNO_3$. It is to be understood that our invention is not limited to this specific range of acid concentrations, however, and that the acid employed may be partially or completely combined, in the form of aluminum nitrate, for example.

The amount of acid employed is conveniently expressed in terms of its ratio to the total alumina content of the aluminous material extracted. In practice the alumina content of a given supply or batch of aluminous material, such as clay or bauxite, is always determined by analysis before extraction, and from the figure thus obtained the amount of acid required is readily determined. We have found that satisfactory results can be obtained with widely differing ratios of alumina equivalents to nitric acid equivalents, and that the preferred range in any case depends in part at least on the concentration of the acid, the temperature and pressure of digestion, and the nature of the raw material. In general we prefer that the amount of free nitric acid employed shall be from 85% to 110% of the amount equivalent to the total amount of alumina in the aluminous material, and we have found that about 95% to 101% is satisfactory in many cases. We have also used other ratios from 75% to 125% with satisfactory results, however.

It is desirable that the aluminum nitrate be crystallized from a basic solution. Such a solution may be obtained directly from the digestion by using a low ratio of acid to alumina, such as 0.75 to 0.85, if the digestion is conducted at suitable temperatures and pressures. However, elevated temperatures and pressures are then necessary to produce a satisfactorily high yield or extraction of alumina from the raw material treated.

We have found that good extraction can be effected at substantially atmospheric pressure by means of our improved process, and when operating at atmospheric pressure we prefer to employ a somewhat higher acid ratio, such as 0.85 to 1.01 or more nitric acid equivalents for each equivalent of alumina. If basic aluminum nitrate solution is not then recovered in the first extraction or digestion, the nitrate liquor may be neutralized with mother liquor, or separated from the insoluble residue and redigested with a further quantity of bauxite or the like, or otherwise made basic, as will be described in more detail hereinbelow.

The temperature and pressure maintained during digestion have an appreciable effect on the yield of alumina, on the basicity of the solution of aluminum nitrate obtained when the ratio of acid to alumina is low, and on the optimum strength and amount of acid employed. While digestion under higher pressures, such as 60 to 200 pounds per square inch for example, generally increases the yield of alumina and the basicity of the solution, whether or not an activating agent is employed, such procedure requires special and expensive equipment which adds materially to the cost of the process. One of the advantages of our present invention is that it makes possible digestion at substantially atmospheric pressures in relatively inexpensive apparatus with results equally as good as, and in some instances better than, those obtainable by means of previous more costly pressure digestions.

We have therefore found that from an economic viewpoint it is frequently preferable to conduct the digestion at substantially atmospheric pressure and at a temperature substantially equal to the boiling point of the slurry. We may, however, employ higher pressures up to 250 pounds per square inch or higher, in which case the temperature is usually increased to the corresponding boiling point. We may also conduct the digestion wholly or in part at reduced pressure or under a partial vacuum.

The period of time during which it is necessary to continue the digestion varies with the temperature and pressure maintained, the strength and amount of acid employed, and other factors. In general it is preferable for economic reasons to keep the digestion period as short as possible. Under most sets of conditions a digestion period of 2 to 5 hours is sufficient, and in preferred instances a digestion of one hour or less produces satisfactory results.

The addition of fluorine compounds to the acid or neutral digesting liquor has the effect of increasing the extraction of alumina, and accelerating its rate of solution to a certain extent, and also of depressing the solution of iron or facilitating its precipitation. This effect is quite generally obtained over a wide range of temperatures, pressures, acid concentrations, and free acid to alumina ratios. One of the outstanding advantages of this feature of our invention is that it makes possible a feasible extraction or digestion process at substantially atmospheric pressure.

We have found that calcium fluoride is effective when employed in amounts ranging from 0.05% to 25% or more of the weight of bauxite or other aluminous material treated. When using sodium fluoride, the amount required is about the same, but with hydrofluoric acid about half as much (by weight) produces equivalent results. The controlling factor appears to be the ratio of fluoride ions or equivalents to aluminous material, and the presence of the positive ion is apparently immaterial with respect to the activation of the reaction.

While the effective ratio of fluorine to aluminous material is from .025% to 12.5% or more, as previously indicated, there seems to be little or no advantage in using a ratio higher than 2.5%, which is equivalent to approximately 100 pounds of calcium fluoride per ton of bauxite, for example. Also the lowest ratio, .025%, or 1 pound of calcium fluoride per ton, is not universally suitable although it suffices in many instances. In general, therefore, we prefer to employ a ratio of 0.1% to 1% fluorine to aluminous material, corresponding to about 4 to 40 pounds of calcium fluoride per ton, or 2 to 20 pounds of hydrofluoric acid per ton.

We have found that in atmospheric digestions with conditions otherwise identical and the same raw material used, the average extraction of alumina was increased from about 60 or 65% to about 80 or 90% of the total alumina by the addition of suitable small quantities of fluorine compounds. We have also found that these activating agents are effective in activating pressure digestions of aluminous material, and that they serve to reduce the time required for extraction and to increase the yield over a wide range of operating pressures.

The presence of fluorine compounds and other suitable activating agents during the digestion has an especially pronounced effect in reducing the ratio of iron to aluminum in the digestion liquor when conditions are such that a basic liquor is produced. In digestions at atmospheric pressure, however, we prefer to employ enough acid to produce a neutral or somewhat acid liquor in order that a high yield of alumina will be assured, and to obtain a product of the highest purity from our process it is therefore desirable to neutralize this acid liquor.

This is suitably accomplished by adding basic mother liquor from the aluminum nitrate crystallization, as described in the aforementioned application of Ralph B. Derr. Other methods are operative, however. For example, acid digestion liquor containing a fluorine compound is redigested with an excess of bauxite or other aluminous ore. The liquor is thus neutralized or made basic, iron is precipitated, and alumina is partially extracted from the fresh ore. The liquor substantially free from iron is separated from the residue of the ore and concentrated to crystallize aluminum nitrate. The residue is redigested with fresh acid, which may have been recovered from the decomposition of aluminum nitrate, and the extraction of alumina from the residue is completed while a further quantity of acid digestion liquor is produced. The residue or mud is now substantially free from alumina, and may be discharged. The acid liquor is redigested with fresh ore, as before, and the liquor and residue are separated. This procedure may be repeated indefinitely, discharging basic aluminum nitrate liquor low in iron, and mud low in alumina, from the alternate steps.

As a further alternative, acid digestion liquor may be treated with bauxite, alumina, or alkalies in sufficient quantity to neutralize the liquor and facilitate precipitation of the iron.

Neutral or basic aluminum nitrate liquor, produced directly or by neutralization of acid liquor in any suitable manner, is concentrated and cooled to crystallize aluminum nitrate. The basicity of the liquor increases during concentration because of the expulsion of nitric acid, and a basic mother liquor is produced, which may be employed to neutralize acid digestion liquor if desired. Because of the basicity and low iron content of the liquor from which they are crystallized, aluminum nitrate crystals of high purity are recovered. These are decomposed by heating, with or without the addition of steam or water, and nitric acid vapors or other oxides of nitrogen are driven off, leaving alumina of high purity. These vapors and those evolved during concentration of the liquor are recovered in the form of nitric acid solution, as by scrubbing or condensation, and employed in the initial digestion of a further quantity of aluminous material.

To illustrate the excellent results obtainable with our process when working with low grade raw material, a digestion of tailings from a bauxite washing plant will now be described. The tailings contained 48.7% $Al_2O_3$, 11.44% $SiO_2$ and 7.28% $Fe_2O_3$. These tailings were digested for 5 hours at atmospheric pressure and at a temperature of 100° to 103° C. with 30% nitric acid and calcium fluoride amounting to 5% of the weight of the bauxite tailings. The acid was supplied in such amount as to be equivalent to 95% of the total alumina. After the digest was completed, the liquor was separated from the residue. The ratio of $Fe_2O_3$ to $Al_2O_3$ in the liquor was 0.247%, and 94.5% of the alumina was recovered.

It will be obvious to those skilled in the art that certain modifications can be made in the several steps of our process, in addition to those described by way of example hereinabove, without departing from the spirit of our invention, and it is our intention that the claims shall cover such modifications as are included within the scope thereof.

We claim as our invention:

1. The process of producing alumina, which comprises treating aluminous material with nitric acid in the presence of a fluorine compound to form aluminum nitrate, and decomposing the aluminum nitrate by heat.

2. The process of producing alumina, which comprises digesting aluminous material with nitric acid in the presence of a fluoride to form aluminium nitrate, and decomposing the aluminum nitrate by heat to obtain alumina.

3. The process of producing alumina, which comprises digesting aluminous material with nitric acid in the presence of hydrofluoric acid to form aluminum nitrate, and decomposing the aluminum nitrate by heat to obtain alumina.

4. The process of producing alumina, which comprises digesting aluminous material with a solution containing 20% to 50% nitric acid and a small amount of fluorine compound to form aluminum nitrate, and decomposing the aluminum nitrate to obtain alumina.

5. The process of producing alumina, which comprises digesting aluminous material with a solution containing nitric acid and a compound containing fluorine amounting to .025% to 2.5% of the weight of the aluminous material to form aluminum nitrate, and decomposing the aluminum nitrate to obtain alumina.

6. The process of extracting alumina from aluminous material, which comprises digesting the material with a solution containing about 20% to 50% nitric acid and a soluble fluorine compound containing fluorine amounting to .025% to 2.5% of the weight of aluminous material, thereby removing a substantial part of the alumina from said material in the form of aluminum nitrate.

7. The process of extracting alumina from aluminous material, which comprises calcining the material and digesting it with a solution containing nitric acid and a small quantity of an activating fluorine compound.

8. The process of extracting alumina from aluminous material, which comprises digesting the material with a solution containing an activating fluorine compound and nitric acid equivalent to from 85% to 110% of the total alumina content of the said material to form aluminum nitrate.

9. The process of extracting alumina from aluminous material, which comprises digesting the aluminous material with nitric acid in the presence of an activating fluorine compound at a pressure less than about 200 pounds per square inch for a period sufficient to remove at least a substantial part of the alumina from said aluminous material in the form of aluminum nitrate solution with a relatively low iron content.

10. The process of producing alumina, which comprises digesting aluminous material with nitric acid in the presence of an activating fluorine compound to form aluminum nitrate, decomposing the aluminum nitrate by heat to obtain substantially pure alumina and to drive off nitric acid in the gaseous state, recovering it in the form of nitric acid solution, and digesting a further quantity of aluminous material therewith.

11. The process of producing alumina, which comprises digesting aluminous material with a nitric acid solution containing a small amount of fluorine compound to form a basic solution of aluminum nitrate with low iron content, separating the solution from undissolved residues, crystallizing aluminum nitrate from the solution, and decomposing the aluminum nitrate crystals to obtain substantially pure alumina.

12. The process of producing alumina, which comprises digesting aluminous material with a nitric acid solution containing a small amount of fluorine compound to extract at least a substantial part of the alumina from said material in the form of aluminum nitrate solution, adding basic material containing an aluminum compound to the solution to increase its basicity and facilitate elimination of iron, crystallizing substantially pure aluminum nitrate from the resulting basic solution, and decomposing the aluminum nitrate crystals by heat to obtain alumina.

13. The process of producing alumina, which comprises digesting aluminous material with a nitric acid solution containing an activating fluorine compound to extract alumina from said material in the form of an acid solution of aluminum nitrate, separating the solution from undissolved residues, treating the solution with a further quantity of aluminous material to obtain basic aluminum nitrate solution, separating the solution from the partially extracted residue, crystallizing aluminum nitrate from the separated basic solution and decomposing it to obtain alumina, and treating the partially extracted residue with a nitric acid solution to obtain a further quantity of acid aluminum nitrate solution.

CHARLES B. WILLMORE.
CONRAL C. CALLIS.